UNITED STATES PATENT OFFICE.

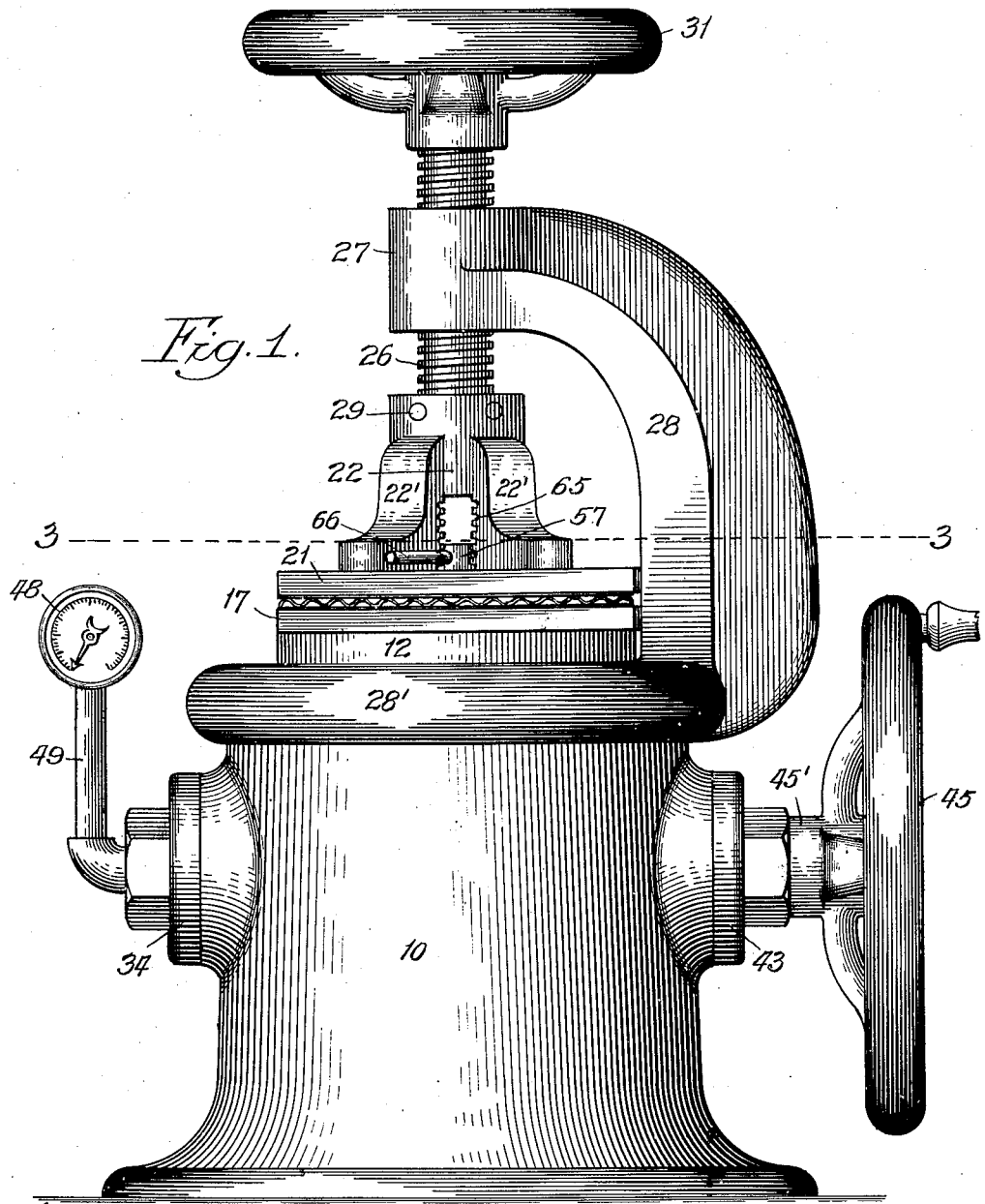

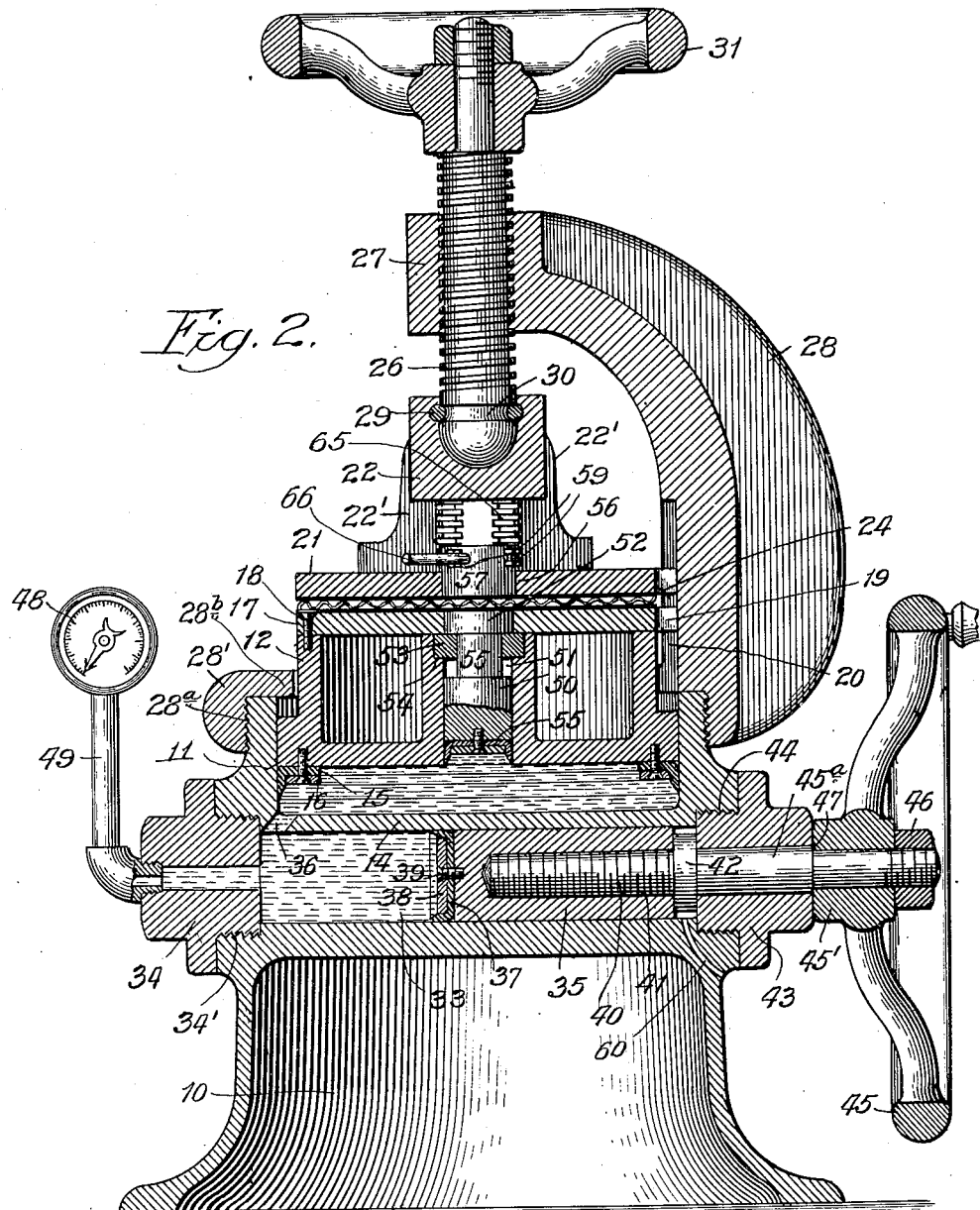

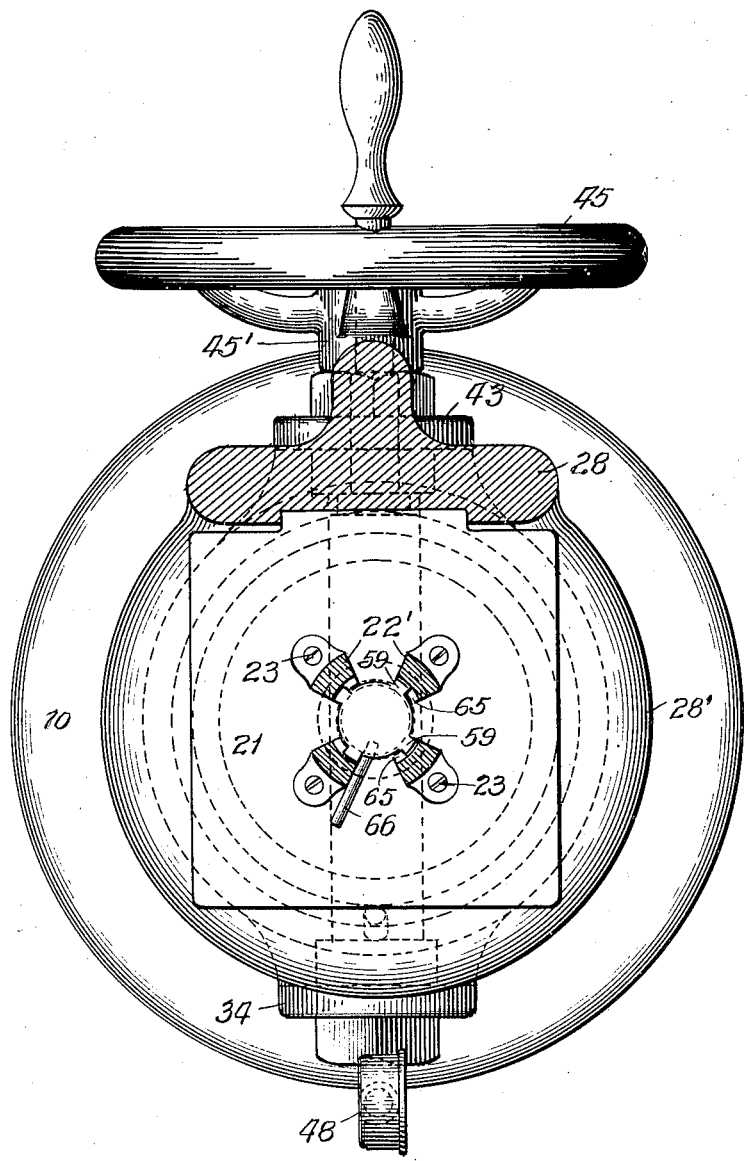

EDWARD R. HANKINS AND ALONZO BROWN, OF CHICAGO, ILLINOIS, ASSIGNORS, BY DIRECT AND MESNE ASSIGNMENTS, TO MID-WEST BOX COMPANY, OF ANDERSON, INDIANA, A CORPORATION OF INDIANA.

TESTING-MACHINE.

1,174,251.  Specification of Letters Patent.  Patented Mar. 7, 1916.

Application filed May 18, 1914. Serial No. 839,252.

*To all whom it may concern:*

Be it known that we, EDWARD R. HANKINS and ALONZO BROWN, residents of Chicago, in the county of Cook and State of Illinois, have invented certain new and useful Improvements in Testing-Machines, of which the following is a full, clear, and exact description.

The invention relates to machines for testing corrugated board and the like.

It has heretofore been the practice to make a puncture test of corrugated board by exposing a limited area of a sheet to pressure applied to one face thereof by an elastic diaphragm. By means of these prior devices, a puncture test of the board was made, pressure being applied to the board by the elastic diaphragm until it was punctured, the pressure at which the board was punctured being indicated by a gage.

In practice it has been found that the quality of the corrugated board depends not only upon its capability of resisting puncture, but also upon its resistance to crushing stresses, because corrugated board, when crushed is comparatively inefficient for boxing purposes.

One object of the invention is to provide a testing machine whereby the resistance of the board to crushing stresses will be indicated, and whereby a puncture test of the corrugated board may also be made.

Another object of the invention is to provide a puncture testing device in which the use of an elastic diaphragm is avoided because in practice these diaphragms frequently become defective, worn out or cut. In the attainment of this object, the machine is equipped with a solid plunger which is directly forced to puncture the sheet.

The invention further designs to provide a testing machine of improved construction.

The invention consists in the several novel features hereinafter set forth, and more particularly defined by claims at the conclusion hereof.

In the drawings: Figure 1 is an elevation of the improved testing machine. Fig. 2 is a vertical section. Fig. 3 is a horizontal section taken on line 3—3 of Fig. 1.

The improved machine comprises a base 10. A cylinder 11 is formed in the upper portion of said base and a plunger 12 is slidably mounted in the cylinder. The bottom of the cylinder is formed by a wall 14 and the top of the cylinder is open so that the plunger 12 may slide into and out of the cylinder. The cylinder 11 is adapted to contain fluid under pressure, and a packing-ring 15 secured to the under side of the plunger 12 by a ring 16, is provided to prevent the escape of fluid between the cylinder-wall and the piston 12. A plate 17 having a flat surface for a sheet of corrugated board, is secured to the top of plunger 12 by screws 18. A lug 19 at one side of plate 17 fits in a groove 20 to secure plunger 12 and said plate against rotation.

A plate 21, adapted to fit on the top face of a sheet or corrugated board, is secured to a head 22 by screws 23. Plate 21 is provided with a lug 24 fitting in groove 20 to retain the plate against rotation. Plate 21 is vertically adjustable so it can be raised and lowered onto sheets of different thicknesses. Head 22 is rotatably suspended on the screw 26 which passes through a correspondingly threaded socket 27 in an arm 28. Pins 29 passing through head 22 and extending through an annular groove 30 in the lower end of screw 26, serve to rotatably connect said head and screw, so that rotation of the screw in socket 27 will raise or lower the head 22 and plate 21. A hand-wheel 31 is secured to the upper end of screw 26 so it can be easily turned.

Arm 28 is formed on a ring 28' which is connected by a screw-thread 28$^a$ to the upper portion of base 10 so that the arm will be readily connected to the base. Ring 28' is provided with a flange 28$^b$ which overlies the marginal portion of plunger 12, and serves as a stop for such plunger. Plates 17 and 21 serve as co-acting press-members for holding and crushing a sheet placed therebetween.

A horizontally extending cylinder 33 is formed below bottom wall 14 of cylinder 11 in the base 10. One end of this cylinder is closed by a cap 34 which is secured by a screw-thread 34' in the base 10. A plunger 35 is slidably fitted in cylinder 33. A duct 36 leads from cylinders 33 to cylinder 11. These cylinders are filled with suitable liquid, and the cylinder 33 and plunger 35 serve as means for compressing the fluid in the cylinders so that a corresponding pressure will be exerted upon the under side of plunger 12. A packing ring 37 is secured to the inner end of piston 35 by a plate 38 and screw 39, to provide against leakage of the fluid between the piston 35 and the wall of cylinder 33. A screw 40 is threaded to a socket 41 in piston 35 and has a shoulder 42 which fits against the inner end of a removable cap 43 which is secured to a base 10 by a screw-thread 44. The stem 45$^a$ of screw 40 is journaled in, and extends through cap 43, and a hand-wheel 45 is secured to the outer side of the stem by a nut 46. The hub 45′ of hand-wheel 45 fits against a shoulder 47 on the stem and against the outer end of cap 43 so that the screw 40 will be rotatable in the cap and will be held against longitudinal movement in the cap to cause the plunger 35 to be moved longitudinally in cylinder 33 when the hand-wheel 45 is turned. A vent opening 60 is formed in base 10 to permit air to pass into and out of that portion of cylinder 33, which is disposed outside of plunger 35.

A pressure indicator 48 on a pipe 49 which is tapped into cap 34 and communicates with the cylinder 33, serves to indicate the pressure of the fluid in the communicating cylinders 33 and 11.

To make a crushing test or a test to determine the pressure required to crush the corrugated board, a sheet of board is placed upon plate 17 when the plunger 35 is in the position shown in Fig. 2 of the drawings. Hand-wheel 31 is then operated to lower plate 21 onto the top of the corrugated board. Hand-wheel 45 will then be operated to turn screw 40 and force piston 35 inwardly, which will put the fluid in cylinders 11 and 33 under pressure. This operation will be continued until the corrugated board yields to the pressure or will be crushed. The pressure necessary to effect such crushing is indicated by the gage 48.

The machine is also adapted to make a puncture test of the sheet. For this purpose, a plunger 50 is fitted in a cylinder 51 formed in the main plunger 12. The upper end 52 of this plunger fits in an opening in plate 18 and is normally flush with the exposed face of said plate. A ring 53 held between a shoulder 54 on the wall of cylinder 50 and plate 17 and fitting around the reduced portion 55 of plunger 50, serves to limit the play of plunger 50. A packing-ring 55 is secured to the lower end of plunger 50. Cylinder 51 opens into cylinder 11 so that the lower end of the plunger 50 will be exposed to the pressure of the fluid in cylinder 11. Plate 21 is formed with an opening 56 slightly larger than the plunger 52, and a plug 57 fits in said opening, being normally flush with the lower face of plate 21, and is removably connected to the standards 22′ of head 22 so that plunger 57 can be raised above the lower surface of plate 21 when a puncture test is to be made. When the plunger 57 is thus raised, the backing from that portion of the sheet above plunger 52 will be removed, and when the necessary pressure is applied to plunger 50, its upper end 52 will puncture or break the sheet.

Plug 57 which is provided with vertical series of ribs 59 which are adapted to engage ribs 65 on the standards of head 22. A handle 66 is secured to a plug 57 so that the latter may be turned to disengage ribs 59 from lugs 65. When the lugs 59 are turned out of registry with lugs 65, the plug 57 may be raised or lowered. Assuming the plug to be in operative position in plate 21, and it is desired to raise it into inoperative position at which time ribs 59 and lugs 65 will be interlocked, the operator will turn plug 57 to disengage ribs 59 from lugs 65. Then the plug may be raised, and locked in raised position by turning the plug to again bring the lugs into locking relation. Reverse operation will restore the plug to its operative position.

To make a puncture-test, a sheet will be placed between plates 17 and 21 and plate 21 will be lowered to hold the sheet. Hand-wheel 45 will then be operated until the fluid in cylinders 11 and 51 is under sufficient pressure to force the upper end of plunger 50 through the sheet between the plates 17 and 21, plug 57 being raised at such time. The pressure of the fluid at the time of puncture, will be indicated by gage 48 so that the pressure required to puncture the corrugated board may be determined therefrom.

Usually the crushing test is made first because a lower pressure is required, and after the sheet has been crushed, wheel 45 will be operated to put the liquid in the cylinder 11 under a higher pressure which is usually necessary to puncture the sheet. Thus by substantially continuous operation of the hand-wheel 45, the sheet will be subjected to both crushing and puncture tests. Furthermore, by making the puncture test on crushed board, a more accurate test results because the liners of the boards are then firmly held against the filler sheet, and the combined strength of the sheets forming the corrugated board, will be indicated. The machine may of course be used solely for a puncture test on non-crushable sheets.

It will be obvious that when a sheet has once been placed in position between the press-plates 17, 21 it can be operated to successively make both a crushing test and a puncture test without removing the sheet between the tests.

The invention thus provides an improved machine, in which the strength of the corrugated board in resisting crushing stresses may be ascertained and by which a puncture test may also be made. By providing a machine in which both of these tests may be made, the quality of the corrugated board may be definitely determined.

The invention also provides an improved machine, by which a puncture test may be made, which dispenses with the use of a flexible diaphragm which is likely to become broken when subjected to pressure without the necessary backing.

The invention is not to be understood as restricted to the details set forth, since these may be modified within the scope of the appended claims without departing from the spirit and scope of the invention.

Having thus described the invention, what we claim as new and desire to secure by Letters Patent, is:

1. In a machine for testing sheets of corrugated board and the like, the combination of a pair of coacting press-members having continuous faces of defined area formed to crush the sheet therebetween, means for applying pressure to one of said members to crush the sheet, pressure operated means in one of said members for puncturing the sheet means for controlling the application of said puncturing means, and means for indicating the crushing and puncturing pressures.

2. In a machine for testing sheets of corrugated board and the like, the combination of a pair of coacting press-members having continuous faces of defined area formed to crush the sheet therebetween, means comprising a cylinder and a plunger for operating one of said members to crush the sheet, pressure operated means in one of said members for puncturing the sheet means for controlling the application of said puncturing means, and means for indicating the crushing and puncturing pressures.

3. In a machine for testing sheets of corrugated board and the like, the combination of a pair of coacting press-members having continuous faces of defined area formed to crush the sheet therebetween, means comprising a cylinder and plunger for operating one of said members to crush the sheet, means disposed in one of said members and operated by the fluid pressure in said cylinder for puncturing the sheet, means for controlling the application of said puncturing means and means for indicating the crushing and puncturing pressures.

4. In a machine for testing sheets of corrugated board and the like, the combination of a pair of coacting press-members having continuous faces of defined area formed to crush the sheet therebetween, fluid pressure operated means for operating one of said members to crush the sheet, means for adjustably sustaining the other member, means disposed in one of said members and operated by the fluid pressure for puncturing the sheet, means for controlling the application of said puncturing means and means for indicating the crushing and puncturing pressures.

5. In a machine for testing sheets of corrugated board and the like, the combination of a pair of coacting press-members having continuous faces of defined area formed to crush the sheet therebetween, means for applying pressure to one of the members to crush the sheet, a plunger in one of said members for puncturing the sheet, the other member having an opening therein opposite said plunger means for closing said opening at will, means for operating said plunger, and means for indicating the crushing and puncturing pressures.

6. In a machine for testing sheets of corrugated board and the like, the combination of a pair of coacting press-members having continuous faces of defined area formed to crush the sheet therebetween, a plunger on which one of said members is mounted, a fluid cylinder for said plunger, means for compressing fluid in the cylinder to operate the plunger to crush a sheet, a plunger for puncturing the sheet mounted in the first-mentioned plunger and operated by fluid in said cylinder, and means for indicating the crushing and puncturing pressures.

7. In a machine for testing sheets of corrugated board and the like, the combination of a pair of coacting press-members, a plunger on which one of said members is mounted, a fluid-cylinder for said plunger, means for compressing fluid in the cylinder to operate the plunger to crush a sheet, and a plunger for puncturing the sheet mounted in the first mentioned plunger and operated by fluid in said cylinder, the other press-member being provided with an opening opposite the puncturing plunger.

8. In a machine for testing sheets of corrugated board, and the like, the combination of a pair of coacting press-members, a plunger on which one of said members is mounted, a fluid cylinder for said plunger, means for compressing fluid in the cylinder to operate the plunger to crush a sheet, a plunger for puncturing the sheet mounted in the first mentioned plunger and operated by fluid in said cylinder, and a removable plug fitting in said opening.

9. In a machine for testing sheets of corrugated board and the like, the combination of a pair of coacting press-members, a plunger on which one of said members is mounted, a fluid-cylinder for said plunger, means for compressing fluid in the cylinder to operate the plunger to crush a sheet, a plunger for puncturing the sheet mounted in the first mentioned plunger and operated by fluid in said cylinder, the other press-member being provided with an opening opposite the puncturing plunger, a removable plug fitting in said opening, and a locking-connection between the plug and the member having an opening therein.

10. In a machine for testing sheets of corrugated board and the like, the combination of a base, a cylinder in the base, a plunger in said cylinder, a plate on said plunger, a coacting plate, said plates having continuous faces of defined area formed to crush the sheet therebetween, means mounted on the base for supporting the coacting plate, means in the base for putting fluid in the cylinder under pressure to operate one of the plates to crush the sheet, and means for indicating the pressure required to crush the sheet.

11. In a machine for testing sheets of corrugated board and the like, the combination of a pair of coacting plates, means for adjustably sustaining one of said plates, a plunger on which the other plate is mounted, a cylinder for containing fluid under pressure in which said plunger is mounted, a plunger having a limited area for puncturing the sheet slidably mounted in said first mentioned plunger and operated by fluid in said cylinder, means for putting fluid in the cylinder under pressure to cause the sheet to be crushed between said plates, and means for indicating the pressure of fluid in the cylinder.

12. In a machine for testing sheets of corrugated board and the like, the combination of a base, a cylinder in the base, a plunger in said cylinder, a plate on said plunger, a coacting plate, a plunger for puncturing the sheet slidably mounted in said first mentioned plunger and operated by fluid in said cylinder, means in the first mentioned plunger for limiting the movement of the puncturing plunger, and means in the base for putting fluid in the cylinder under pressure to operate one of the plates to crush the sheet.

13. In a machine for testing sheets of corrugated board and the like, the combination of a pair of coacting plates, means for adjusting one of said plates relatively to the other, one of said plates having an opening therein, a plunger mounted to slide in said opening and normally flush with the operative face of the plate in which it is mounted, the other plate having an opening therein so that a sheet held between said plates may be punctured by said plunger, a cylinder for containing fluid under pressure, said plunger being exposed to the pressure of fluid in the cylinder, and means for putting the fluid under pressure to cause said plunger to puncture the sheet.

14. In a machine for testing sheets of corrugated board and the like, the combination of a pair of coacting plates, means for adjusting one of said plates relatively to the other, one of said plates having an opening therein, a plunger mounted to slide in said opening and normally flush with the operative face of the plate in which it is mounted, the other plate having an opening therein so that a sheet held between said plates may be punctured by said plunger, a cylinder for containing fluid under pressure, said plunger being exposed to the pressure of fluid in the cylinder, means for putting the fluid under pressure to cause said plunger to puncture the sheet and a removable plug for said opening.

EDWARD R. HANKINS.
ALONZO BROWN.

Witnesses:
  FRED GERLACH,
  MILDRED STUMPF.